W. G. PFEIFER.
RESILIENT GROUND WHEEL.
APPLICATION FILED FEB. 15, 1918.
1,288,166.
Patented Dec. 17, 1918.
2 SHEETS—SHEET 1.
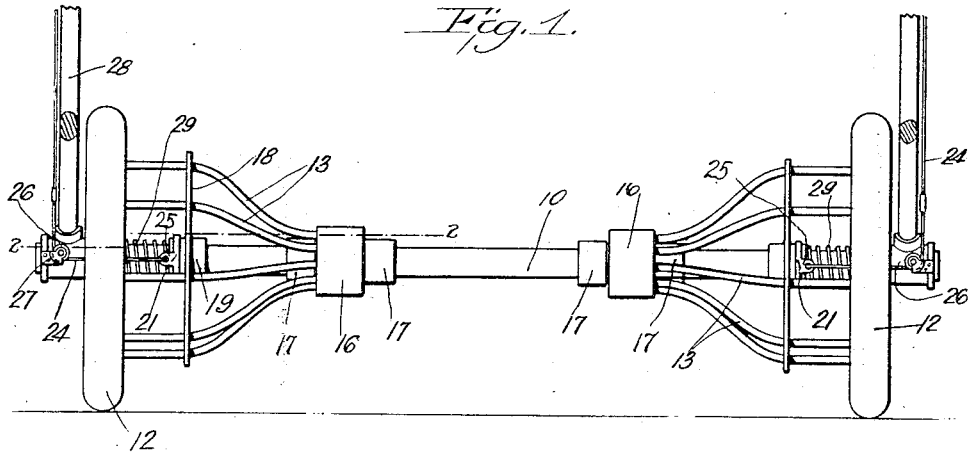
Fig. 1.
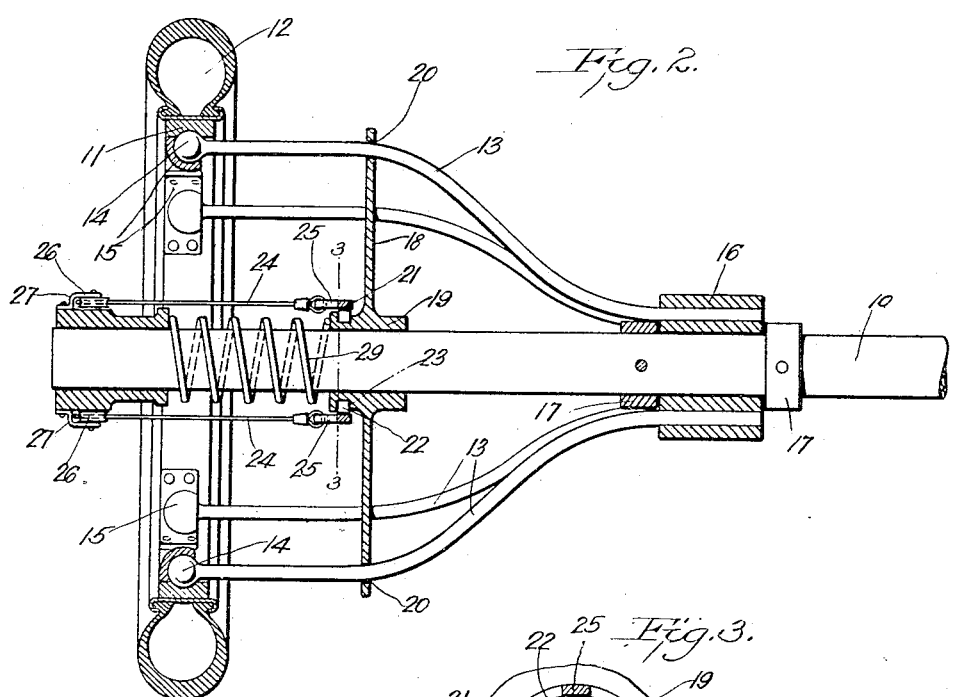
Fig. 2.
Fig. 3.
WITNESSES
INVENTOR
W. G. Pfeifer
BY
ATTORNEYS

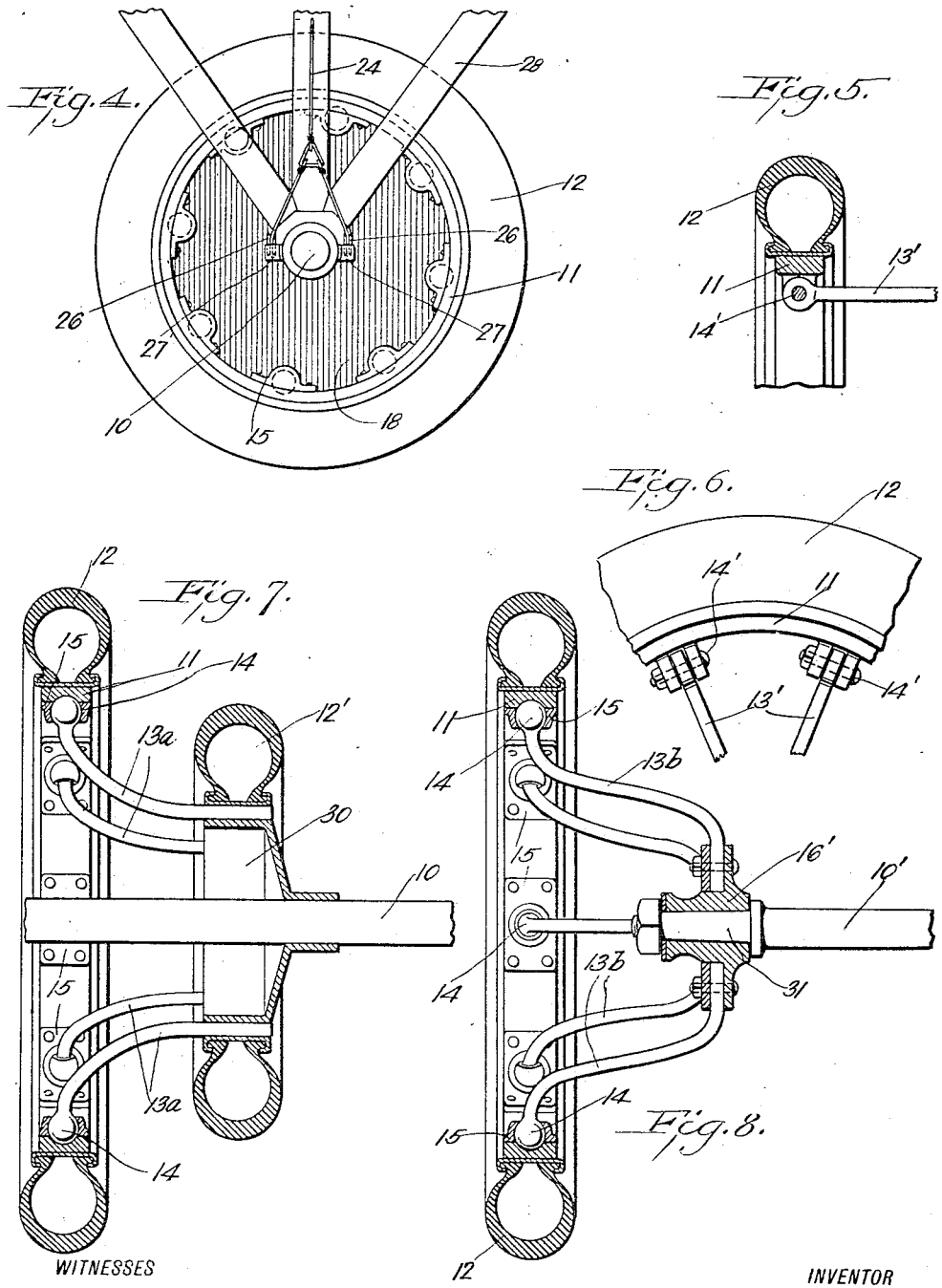

UNITED STATES PATENT OFFICE.

WILLIAM G. PFEIFER, OF BROOKLYN, NEW YORK.

RESILIENT GROUND-WHEEL.

1,288,166.                Specification of Letters Patent.    Patented Dec. 17, 1918.

Application filed February 15, 1918.   Serial No. 217,341.

*To all whom it may concern:*

Be it known that I, WILLIAM G. PFEIFER, a citizen of the United States, and a resident of the city of New York, borough of Brooklyn, in the county of Kings and State of New York, have invented a new and Improved Resilient Ground-Wheel, of which the following is a full, clear, and exact description.

This invention relates to resilient wheels and has particular reference to ground wheels for aeroplanes or like vehicles. It is to be understood, however, that the field of usefulness of this improvement is not to be unnecessarily limited.

Among the objects of the invention is to provide an improved type of wheel the rim portion of which is or may be rigid, but provided with a series of flexible arms or spokes which extend laterally from the wheel or in a direction parallel to the axis thereof to a considerable distance from the plane of the wheel rim.

Another object of the invention is to provide means to vary the flexibility of said arms, the means for varying the flexibility being operative at any desired distance from the wheel.

A further object of the invention is to provide an improved form of bumper or means to limit the extent of distortion of the wheel with respect to its axis when there are excessive strains or shocks.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which Figure 1 is an elevation of one form of my improved wheel shown as in duplicate or such as is applicable for use on the supporting frame and axle of an aeroplane.

Fig. 2 is a horizontal sectional view on the line 2—2 of Fig. 1.

Fig. 3 is a vertical transverse section on the line 3—3 of Fig. 2.

Fig. 4 is an elevation as would be seen from the left of Fig. 1.

Fig. 5 is a detail indicating a modified means for connecting the flexible arm to the wheel or rim.

Fig. 6 is a side elevation corresponding to Fig. 5.

Fig. 7 is a modification showing one form of positive means to limit the extent of flexibility of the arms or spokes; and Fig. 8 is a further modification of my improvement as it may be adapted for carriages or other vehicles.

Referring now to the first four figures, I show my improved wheel used in connection with a stationary or non-rotary axle 10 of any suitable length, construction or means of support. Each wheel coöperating with said axle comprises a rim 11 of any suitable or conventional rigid construction which may be supplied with a pneumatic tire 12 if desired, also of conventional type. The rim and tire are designed to be normally concentric with the axle but under the force of strain or shock from any source are adapted to be moved to a position eccentric to the axle.

As one means for supporting the wheel rim with respect to the axle I provide a series of spoke arms 13 each having at its outer end a ball 14 coöperating with a socket 15 fixed to the inner surface of the rim and representing any suitable means for pivotally articulating the arms to the rim. The other or inner ends of the arms 13 are secured in any suitable manner in or to a collar 16 journaled or swiveled upon the axle at some considerable distance remote from the plane of the wheel rim and held from endwise movement on the axle by means of fixed collars 17 or their equivalent and between which the collar 16 is free to rotate around the axle. Between the ball 14 and collar 16 each arm 13 is adapted to bend or flex, the combined strength of the arms all coöperating with one another determining the eccentricity of the wheel under various conditions in practice. The outer portions of the arms are indicated as substantially straight and approximately parallel to the axle. This straight portion may be of any desired proportion or part of the arm and the remaining portion extending inward therefrom to the collar 16 may be relatively perpendicular to the axle or arranged at any desired inclination thereto. The means for articulating the arms to the rim provides that whenever the wheel is distorted or put under shock or pressure tending to render it eccentric the joints between the arms and the rim will all accommodate themselves readily to such movement.

Since the flexibility of each arm between the joint 14 and the collar 16 will depend upon its length and cross sectional structure I provide means for varying the effective flexibility thereof at will according to varying conditions. To this end I provide a disk like spider 18 having a hub 19 fitted rotatably and slidably upon the axle between the plane of the rim and the collar 16 and having formed adjacent to its periphery a series of openings 20 through which the several arms 13 project. The main portion of the spider is sufficiently stiff to constitute a substantially rigid brace between the axle and the portions of the arms intermediate of the wheel rim and collar. Any suitable means may be provided to shift or adjust the spider endwise of the axle so as to vary the effective length of the arms 13 between the same and the wheel rim. To this end I provide a ring or collar 21 surrounding the outer end of the hub 19 and from which a plurality of antifriction rollers 22 project into a groove 23 formed in the hub. 24 indicates a plurality of flexible connections fixed to ears 25 on said ring 21 and leading thence outward, under and around direction pulleys 26 carried in brackets 27 at the outer end of the axle. These connections lead upward from the pulleys 26 along a frame 28 and may be manipulated from any desired point or distance so as to draw the spider outward against the force of a strong spring 29 tending to drive the spider inward toward the center of the axle or the other wheel. At any time if the operator desires to render the arms stiffer than normally he will draw outward upon the spider and so shorten the effective length of the arms.

Figs. 5 and 6 indicate a hinge 14′ for articulating the outer ends of the arms 13′ to the rim 11.

Fig. 7 covers a modification in which the flexible arms 13ª are fixed at their inner ends in any convenient manner to what may be regarded the rim portion 30 of an auxiliary wheel smaller in diameter than the main wheel and carried upon the axle 10 in a plane parallel to the plane of the main wheel. This auxiliary wheel may be provided with a pneumatic tire 12′ if desired. According to this construction it is obvious that the flexibility of the arms 13ª and the possible eccentricity of the main wheel carried by the outer ends thereof will be limited by the auxiliary wheel. In Fig. 8 the flexible arms 13ᵇ are indicated as having substantially the same relation or connection with the main wheel rim 11 as was described in connection with the first form. Their inner ends, however, are shown as fixed to a hub 16′ journaled for rotation on the spindle portion 31 of the axle 10′. So far as the operation of this wheel is concerned it may be substantially similar to that of an ordinary carriage or wagon wheel with respect to the axle, but with respect to the spoke arms and the manner of connecting them to the rim 11, this modification is similar to the others set forth herein. It will be noted that in all forms of my invention disclosed herein there is provided a free clearance space between the main wheel rim and its supporting means in the plane of the rim.

I claim:

1. In a wheel construction of the character set forth, the combination with an axle, of a rigid wheel rim surrounding the axis thereof and having free clearance therefrom in the plane of the rim, a series of flexible arms connected at their outer ends to said rim, means to support the inner ends of said arms with respect to the axle and laterally of the wheel rim, and means to limit the effective flexibility of the arms.

2. In a wheel of the character set forth, the combination with a supporting member, a rigid wheel rim surrounding the same, a series of flexible arms connected at their outer ends to the rim and extending both laterally and inward toward said supporting member, means to secure the inner ends of the arms to said member, and adjustable means between the plane of the rim and the inner ends of the arms to vary the effective length and flexibility of the arms.

WILLIAM G. PFEIFER.

Copies of this patent may be obtained for five cents each, by addressing the "Commissioner of Patents, Washington, D. C."